J. L. HARLEY & X. FENDRICH.
Steam-Valves.

No. 156,703.  Patented Nov. 10, 1874.

Witnesses.  
D R Cowl  
Edmund Masson

Inventors.  
Joseph L. Harley & Xaver Fendrich  
By their Attorney, A. B. Stoughton.

UNITED STATES PATENT OFFICE.

JOSEPH L. HARLEY AND XAVER FENDRICH, OF WASHINGTON, D. C.

IMPROVEMENT IN STEAM-VALVES.

Specification forming part of Letters Patent No. 156,703, dated November 10, 1874; application filed October 5, 1874.

*To all whom it may concern:*

Be it known that we, JOSEPH L. HARLEY and XAVER FENDRICH, of Washington city, in the District of Columbia, have invented certain new and useful Improvements in Steam-Valves; and that the following is a full, clear, and exact description of the same, reference being had to the accompanying drawings making a part of this specification, in which—

Figure 1:
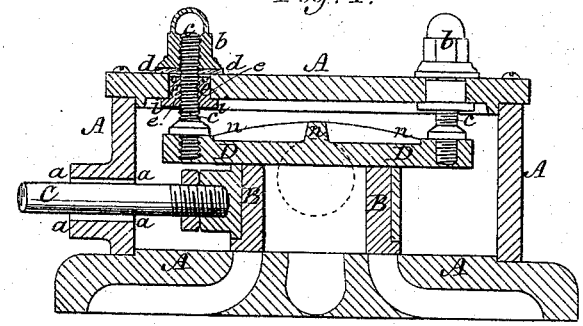
Figure 2:
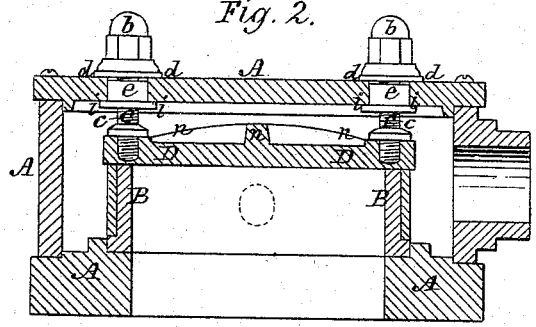
Figure 3:
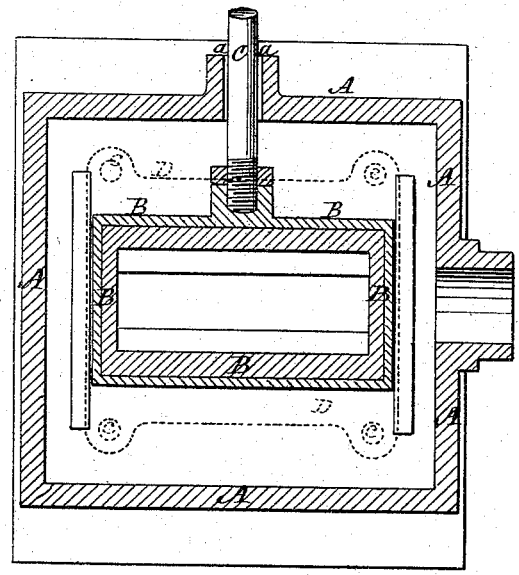

Figure 1 represents a longitudinal vertical section through the valve. Fig. 2 represents a transverse vertical section thereof, and Fig. 3 represents a horizontal section through the same.

Our invention relates to certain mechanisms for adjusting the bonnet of the valve from the exterior of the valve case or chest, and firmly holding it in position when adjusted, as will be explained.

The valve chest or case A may be of any of the well-known forms of construction; and the valve B is of the open or box-formed valve, with its rod or stem C passing out and through a packed opening at $a$. The steam inlet and exit passages may be made in any of the usual well-known ways. The bonnet D, which serves as one of the bearings or seats for the valve B to move in contact with, is attached to and suspended from the top plate of the valve, and made adjustable thereto, as follows: At each corner of the bonnet D is secured a set-screw, $c$, and each screw passes through a flanged nut, $e$, let into and so as to pass through, or nearly so, the cap or top plate of the valve-chest, while the flange $i$ thereof bears against the under side of said top plate. These flanged nuts are readily turned by a forked wrench from the exterior of the valve-case, so as to raise, lower, or adjust the bonnet D to the valve B. Over the protruding ends of the screws $c$ are run screw-caps $b$, which are run down upon a gasket, $d$, so as to completely pack the joints between themselves, the flanged nuts $e$, and the cap or top plate of the valve chest or case, and act as jam-nuts to the flanged nuts, to hold the bonnet D in its adjusted position.

It will be readily seen that this adjustment is all made from the exterior without removing the top or cap plate of the valve-case. It is only necessary to run off the screw-caps $b$, and with a pin or forked wrench turn the nuts $e$ until the bonnet has its proper frictional bearing upon the valve B. Then replace the gaskets and run on the screw-caps, and everything is tight and firm. The bonnet D, to be sufficiently light and strong, may have diagonal ribs cast upon it, as seen at $n$.

Having thus fully described our invention, what we claim is—

In combination with the bonnet D and top plate of the valve-chest A, the screws $c$, flanged nuts $e$, and screw-caps $b$, for the purpose of adjusting the bonnet to the valve from the exterior of the chest, and firmly holding it in its adjusted position to said top plate, substantially as described and represented.

JOS. L. HARLEY.
XAVER FENDRICH.

Witnesses:
JOHN C. LARMAN,
CHAS. PATE.